United States Patent
Harbin, III et al.

(10) Patent No.: US 8,204,633 B2
(45) Date of Patent: Jun. 19, 2012

(54) WATER HEATER DEMAND SIDE MANAGEMENT SYSTEM

(75) Inventors: Benjamin F. Harbin, III, Athens, AL (US); Cecil Ray Holland, Jr., Ardmore, TN (US); Robert J. Toth, Huntsville, AL (US); Adrian O'Neil, Madison, AL (US); Michael Scott Sansom, Huntsville, AL (US); R. Michael Browder, Bristol, TN (US); Brook Marin, Huntsville, AL (US)

(73) Assignee: Carina Technology, Inc., Huntsville, AL (US)

( * ) Notice: Subject to any disclaimer, the term of this patent is extended or adjusted under 35 U.S.C. 154(b) by 386 days.

(21) Appl. No.: 12/493,086

(22) Filed: Jun. 26, 2009

(65) Prior Publication Data

US 2010/0004790 A1    Jan. 7, 2010

Related U.S. Application Data

(60) Provisional application No. 61/077,235, filed on Jul. 1, 2008.

(51) Int. Cl.
*G05D 5/00* (2006.01)
*G05D 3/12* (2006.01)
*G05D 23/00* (2006.01)
*G05D 9/00* (2006.01)
*G05D 11/00* (2006.01)
*G05D 19/00* (2006.01)
*H05B 3/02* (2006.01)

(52) U.S. Cl. ........ 700/295; 700/286; 700/291; 700/296; 700/297; 700/299; 219/483; 219/486; 219/492; 219/494

(58) Field of Classification Search .......... 700/291, 700/286, 295, 296, 297, 299; 219/483, 486, 219/492, 494
See application file for complete search history.

(56) References Cited

U.S. PATENT DOCUMENTS

| 4,023,043 A | 5/1977 | Stevenson | 307/38 |
| 4,419,667 A | 12/1983 | Burr et al. | 340/825.06 |
| 5,056,712 A * | 10/1991 | Enck | 236/20 R |
| 5,502,339 A | 3/1996 | Hartig | 307/31 |

(Continued)

OTHER PUBLICATIONS

Copenheaver, Blaine R., PCT International Search Report and written opiinion, International Searching Authority, ISA/US, Jun. 30, 2009.

(Continued)

*Primary Examiner* — Ronald Hartman, Jr.
(74) *Attorney, Agent, or Firm* — James Richards

(57) ABSTRACT

A system for shifting energy demand from on-peak time windows to off-peak time windows by using hot water heater load shifting, while providing the end user with the level of service (i.e., availability of hot water) according to the user's customary use described by service quality criteria. The shift is accomplished by a controller located at the end user establishment and in communication with a central control server. The controller monitors local water heater upper and/or lower temperature and controls upper and/or lower water heater heating elements in accordance with a demand shift process commanded by the central control server. The controller may determine usage and remaining capacity for reporting back to the central control server. A volumetric capacity and usage determination is disclosed. The control server may select water heaters according to use patterns and/or measured capacity. One embodiment is adapted for use with existing water heaters without disrupting safety features of the existing water heater.

35 Claims, 9 Drawing Sheets

U.S. PATENT DOCUMENTS

| | | | |
|---|---|---|---|
| 5,696,695 A | 12/1997 | Ehlers et al. | 364/492 |
| 5,968,393 A | 10/1999 | Demaline | 219/492 |
| 6,265,699 B1 * | 7/2001 | Scott | 219/483 |
| 6,293,471 B1 | 9/2001 | Stettin et al. | 236/20 R |
| 6,350,967 B1 | 2/2002 | Scott | 219/497 |
| 6,363,216 B1 * | 3/2002 | Bradenbaugh | 392/463 |
| 6,375,087 B1 | 4/2002 | Day et al. | 237/8 A |
| 6,465,764 B1 | 10/2002 | Shahin | 219/486 |
| 6,560,409 B2 | 5/2003 | Troost, IV | 392/498 |
| 6,649,881 B2 | 11/2003 | Scott et al. | 219/492 |
| 6,785,466 B1 | 8/2004 | Jackson et al. | 392/454 |
| 6,795,644 B2 | 9/2004 | Bradenbaugh | 392/463 |
| 6,880,493 B2 * | 4/2005 | Clifford | 122/14.22 |
| 6,955,301 B2 * | 10/2005 | Munsterhuis et al. | 236/20 R |
| 6,989,514 B2 | 1/2006 | Patterson et al. | 219/492 |
| 7,021,073 B2 * | 4/2006 | Sakakibara | 62/238.7 |
| 7,043,149 B2 * | 5/2006 | Morimoto et al. | 392/441 |
| 7,065,431 B2 | 6/2006 | Patterson et al. | 700/299 |
| 7,117,825 B2 | 10/2006 | Phillips | 122/4 A |
| 7,380,522 B2 * | 6/2008 | Krell et al. | 122/14.2 |
| 7,432,477 B2 | 10/2008 | Teti | 219/492 |
| 7,503,287 B2 | 3/2009 | Friedrich | 122/14.22 |
| 7,852,985 B2 * | 12/2010 | Liu et al. | 378/98.8 |
| 7,925,597 B2 * | 4/2011 | Takano et al. | 705/412 |
| 8,010,812 B2 * | 8/2011 | Forbes et al. | 713/300 |
| 2003/0178408 A1 * | 9/2003 | Ghent | 219/492 |
| 2004/0075343 A1 | 4/2004 | Wareham et al. | |
| 2004/0117330 A1 | 6/2004 | Ehlers et al. | |
| 2005/0004712 A1 * | 1/2005 | Stevens et al. | 700/266 |
| 2007/0175883 A1 * | 8/2007 | Miu et al. | 219/400 |
| 2007/0205915 A1 | 9/2007 | Shuey et al. | |
| 2008/0133065 A1 | 6/2008 | Cannon et al. | |
| 2008/0238710 A1 | 10/2008 | Tolnar et al. | |
| 2008/0314337 A1 * | 12/2008 | Teti | 122/14.1 |
| 2009/0094173 A1 * | 4/2009 | Smith et al. | 705/412 |
| 2009/0105888 A1 | 4/2009 | Flohr et al. | |
| 2009/0164393 A1 * | 6/2009 | Takano et al. | 705/412 |
| 2010/0023176 A1 * | 1/2010 | Imagawa et al. | 700/295 |
| 2010/0161148 A1 * | 6/2010 | Forbes et al. | 700/295 |
| 2010/0204957 A1 * | 8/2010 | Hotton et al. | 702/184 |
| 2010/0206869 A1 * | 8/2010 | Nelson et al. | 219/494 |
| 2010/0290763 A1 * | 11/2010 | Boulay et al. | 392/451 |
| 2011/0172837 A1 * | 7/2011 | Forbes, Jr. | 700/291 |

OTHER PUBLICATIONS

Hartman, Ronald D., Jr. PCT International Preliminary Report on Patentability, IPEA/US, Oct. 6, 2010.

* cited by examiner

WATER HEATER DEMAND SIDE MANAGEMENT SYSTEM

RELATED APPLICATIONS

This application is an application claiming the benefit under 35 USC 119(e) of prior U.S. Provisional Application 61/077,235,titled "Water Heater Demand Side Management System," filed Jul. 1, 2008 by Harbin et al., which is hereby incorporated herein by reference in its entirety.

FIELD OF THE INVENTION

The present invention pertains generally to the field of intelligent power distribution grid technology, more particularly to the field of automatic load management to shift and reduce peak load requirements.

BACKGROUND OF THE INVENTION

Utility control of domestic water heaters as a means to shed and/or shift electrical load during peak demand periods has been available for several decades. However, the effectiveness of currently deployed systems has been somewhat limited in accuracy, reliability and detail. Current systems are typically unidirectional, i.e. commands can be sent from the utility to the water heater to shut off supply power during peak load periods, but there is no upstream communications to verify that the command was received and acted upon, nor how much load was avoided. In fact, it is not unusual for power utilities to discover that the system at the customer premise has been defeated or has otherwise become non-operational. Additionally, even these legacy unidirectional control systems often require substantial capital investment to build up the required RF infrastructure (radio towers and backhaul). In light of the limitations of current water heater control systems, power utilities have been able to offer their customers only relatively small economic incentives to sign up for load shedding plans which have resulted in slow adoption rates.

In recent years, most of the developed world has seen the widespread deployment of various Wide Area Networks (WANs), from digital cellular RF networks to fiber to the home (FTTH), DSL, and broadband over cable. These networks typically feature a relatively low data transport cost. At the same time that these low cost WANs have become available, the world has seen dramatic increases in the cost of petro-fuels, concerns over the emission of $CO_2$, and a reluctance to accept the building of new generation facilities, resulting in a major problem with supply and demand for energy. These colliding factors have created both a great need to shift utility loads to off peak hours whenever possible and the infrastructure required to manage customer side loads. Shifting load to avoid utilizing inefficient and environmentally threatening energy is the fastest path to delay the demand crossing the supply curve and to avoid the tremendous investment in new power generation facilities. Recent reports estimate the cost of a new nuclear plant to be between $9 to $14 billion.

Thus, there is a need for a system to reduce peak load, thus allowing better use of existing power plants and minimizing the need for new power plant construction.

BRIEF DESCRIPTION OF THE INVENTION

Briefly, the present invention pertains to a system for shifting energy demand from on-peak time windows to off-peak time windows by using hot water heater load shifting, while providing the end user with the level of service (i.e., availability of hot water) according to the user's customary use described by service quality criteria. The shift is accomplished by a controller located at the end user establishment and in communication with a central control server. The controller monitors local water heater upper and/or lower temperature and controls upper and/or lower water heater heating elements in accordance with a demand shift process commanded by the central control server. The controller may determine usage and remaining capacity for reporting back to the central control server. A volumetric capacity and usage determination is disclosed. The control server may select water heaters according to use patterns and/or measured capacity. One embodiment is adapted for use with existing water heaters without disrupting safety features of the existing water heater.

The controller may also monitor power quality and/or water heater usage for reporting back to the load management server. In one aspect of the invention, the local controller may separately control the upper heater and lower heater elements to shift the demand load.

In one embodiment, the upper and lower temperatures are lowered during a demand peak.

In another embodiment, the lower temperature is lowered or turned off during a demand peak.

In a further embodiment, the water temperature may be raised before a demand peak to shift demand earlier in time.

In one aspect of the invention, the time at which a temperature is resumed after a peak is randomly varied or varied among a group of establishments to prevent simultaneous resumption of demand from numerous units.

In a further aspect the controller communicates with the load management server and periodically receives a demand profile and algorithm which may be used autonomously in the event of communication outage or to reduce network traffic required to maintain control.

In one embodiment several control procedures may be pre-stored in the controller so that the load management server need only select a pre stored control procedure.

In a further aspect of the invention, the load management server may direct immediate turn off of any number of water heaters or portions of water heaters in response to an extreme or unexpected peak demand.

In a further aspect the controller may monitor and log power quality data including voltage, load, and outage information and communicate with the utility server to deliver power quality log data periodically or upon command.

In a further aspect of the invention, the controller may monitor and log water heater demand information such as demand and temperature by time of day, and may communicate with the load management server to deliver water heater usage pattern data periodically or upon command or initiated by the water heater controller.

In a further aspect of the invention, a first portion of the system may be located at the consumer power meter and a second portion may be located with the water heater. The first portion and second portion may communicate by wireless, wired, or power wiring carrier techniques as well as conventional direct control wiring.

In a further aspect of the invention, hot water usage in gallons of hot water at a desired temperature is estimated based on measuring an upper temperature and a lower temperature of a water heater and observing the power required to maintain the temperature.

In a further aspect of the invention, hot water capacity of a customer's hot water heater is maintained at a predetermined minimum number of gallons of hot water at a desired temperature as a function of expected usage over time.

In a further aspect of the invention, the control server may reduce demand by turning down hot water heaters selected first from users with expected demand being the farthest in the future, and further that the users have stored capacity in excess of predicted demand for each respective user.

In a further aspect of the invention, demand reduction is determined according to demand reduction need per grid route.

In a further aspect of the invention, hot water volumetric usage and remaining capacity of a water heater is estimated based on a model of hot water vertical temperature profile as a function of usage and power applied to the water heater. Alternative measurements include direct measurement of water flow and inlet and outlet temperatures.

In a further aspect of the invention, sufficient monitor information can be collected to determine the effect of peak shift achieved by the system.

In a further aspect of the invention, the water heater controller may be installed to control an existing water heater without voiding the manufacturer's warranty, without invalidating UL or other safety approvals and without violating building codes.

In a further aspect of the invention, the water heater controller may be supplied with an installation kit for a standard water heater, the installation kit including temperature sensors and mounting hardware.

In a further aspect of the invention, a particular household may be classified according to usage patterns and peak profile algorithms may be selected or adapted according to the usage patterns.

In a further aspect of the invention, the controller may have a user override selectable function and a user override event may be communicated to the utility.

These and further benefits and features of the present invention are herein described in detail with reference to exemplary embodiments in accordance with the invention.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The system described here allows the power utility providers to shift energy demand due to hot water heating from on-peak time windows to off-peak windows while providing the end user with the level of service (i.e., availability of hot water) to which they have become accustomed. This shift of demand from on-peak time windows has the effect of reducing the peak to average ratio (i.e., crest factor) of energy demand on a utility's system, which in general allows for a more efficient usage of the utility's resources and allows generation to be shifted to the most efficient production plants available. The demand shift reduces the average production cost of energy (i.e., average cost of a kW-hour) and may delay or completely eliminate the need to build new power generation facilities. Shifting the demand also reduces the impact on the environment by reducing the carbon emissions.

This system enables an electrical utility to move a significant load (12%-18%) which is due to domestic water heating from on-peak demand time windows to off peak time windows, without causing undue inconvenience to the end customer. Because of the advantages, energy providers may provide incentives for the installation of these systems by lower energy rates or discount programs. In addition, the system, by virtue of its energy savings, may qualify for various energy efficiency labels and government incentive programs, for example Energy Star®.

The approach described here utilizes widely deployed WAN networks (digital cellular, fiber to the home, DSL, broadband over cable, 900 mhz, Zigbee, Wi-fi, Wi-max, etc.) to remotely collect data on the end user's hot water utilizations patterns and current water heater tank temperatures. The end user's hot water utilization patterns are analyzed by utility server software databases and applications which use this information to segregate customers with similar utilization patterns into management groups. Based on the aggregate hot water utilization patterns of the different management groups, heating of hot water is enabled/disabled via a control downlink over the WAN or local communications interface in a manner that minimizes on-peak energy utilization for hot water heating while ensuring that the customer has sufficient hot water to meet their normal daily demands.

Figure 1:
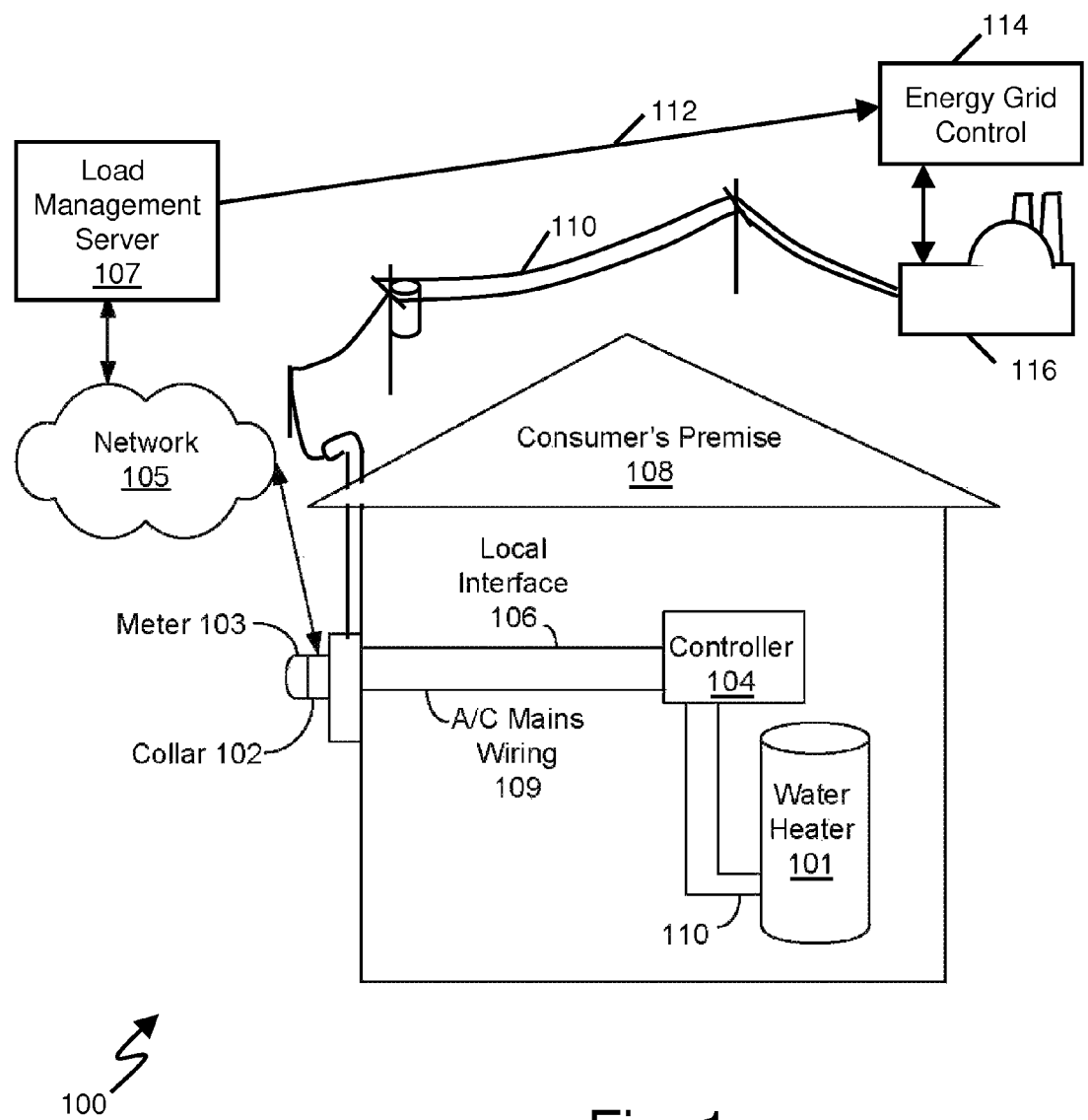
FIG. 1 illustrates a system according to one embodiment of the present disclosure.

FIG. 1 illustrates a system 100 according to one embodiment of the present disclosure. Operation of a water heater 101 in a consumer's premise 108 is controlled by a controller 104. The controller 104 communicates to a collar 102 on the premise's meter 103 via a local interface 106. The collar 102 communicates to a data server 107 via a network 105. Operation of the collar 102 is disclosed generally in U.S. Patent Publication No. US2008-0086394,titled "System and Method for Controlling a Utility Meter," which is incorporated herein by reference. The network 105 may be of any type network or multiple networks known in the art, such as Internet, telephone, Ethernet, analog cellular, digital cellular, short range radio wireless, Zigbee, HomePlug, Wifi, WiMax, broadband over power line, coaxial cable, and the like. In some embodiments, Wide Area Network (WAN) methodologies will be utilized for communicating information and control over the network 105. The network 105 may be any combination of hardware, software, or both. The load management server 107 (also referred to as a control/data server 107) is typically one or more computers adapted to and responsible for coordinating and controlling the water heaters 101 (i.e., commanding the associated water heater controller 104 for the water heater 101) and possibly other appliances and devices on a power grid 110 or portion of a power grid. The server 107 is in communication with numerous water heaters 101 on the grid as well as with a database of associated usage patterns 118 which may be general or specific for each water heater. The server is also in communication with power grid controller 114 and generating station controller 116 having real time load and capacity information as well as expected patterns and other prediction information such as weather and planned construction interruptions. Thus, the server 107 may control each water heater 101 to generate a coordinated load that spreads the peak load of the grid system 112 while maintaining multiple end customer delivery quality criteria. The delivery quality criteria including the availability of hot water in various quantities ad various temperatures according to individual use patterns. The server 107 itself may be owned and operated by the company or utility that owns and operates the power grid 110. Alternatively, multiple organizations and/or agencies may divide the work and responsibility of operating various parts of the energy delivery 112, 114, 116 and load control 107 system.

The local interface 106 is the communications medium between the controller 104 and the collar 102. The local interface 106 may be any suitable communications medium, wired or wireless, standard or proprietary, for example but not limited to: ZigBee, proprietary 900 MHz RF, HomePlug, 802.11a/b/g/n WiFi, or the like.

The system 100 provides for remote monitoring of tank temperature and heating element "on" times and control of the heating elements (either directly via enable/disable commands or indirectly by adjusting the water temperature set point). In some embodiments of the system 100, the hardware is retrofitted to existing water heaters 101. This retrofit hardware is designed to minimize the labor required for retrofit.

The system 100 comprises of the following: The controller 104 is connected between the premise's AC mains wiring 109 and the water heater 101 AC mains input 110. The controller 104 derives power from the AC mains voltage and can connect/disconnect AC mains voltage to the water heater 101.

Figure 2:
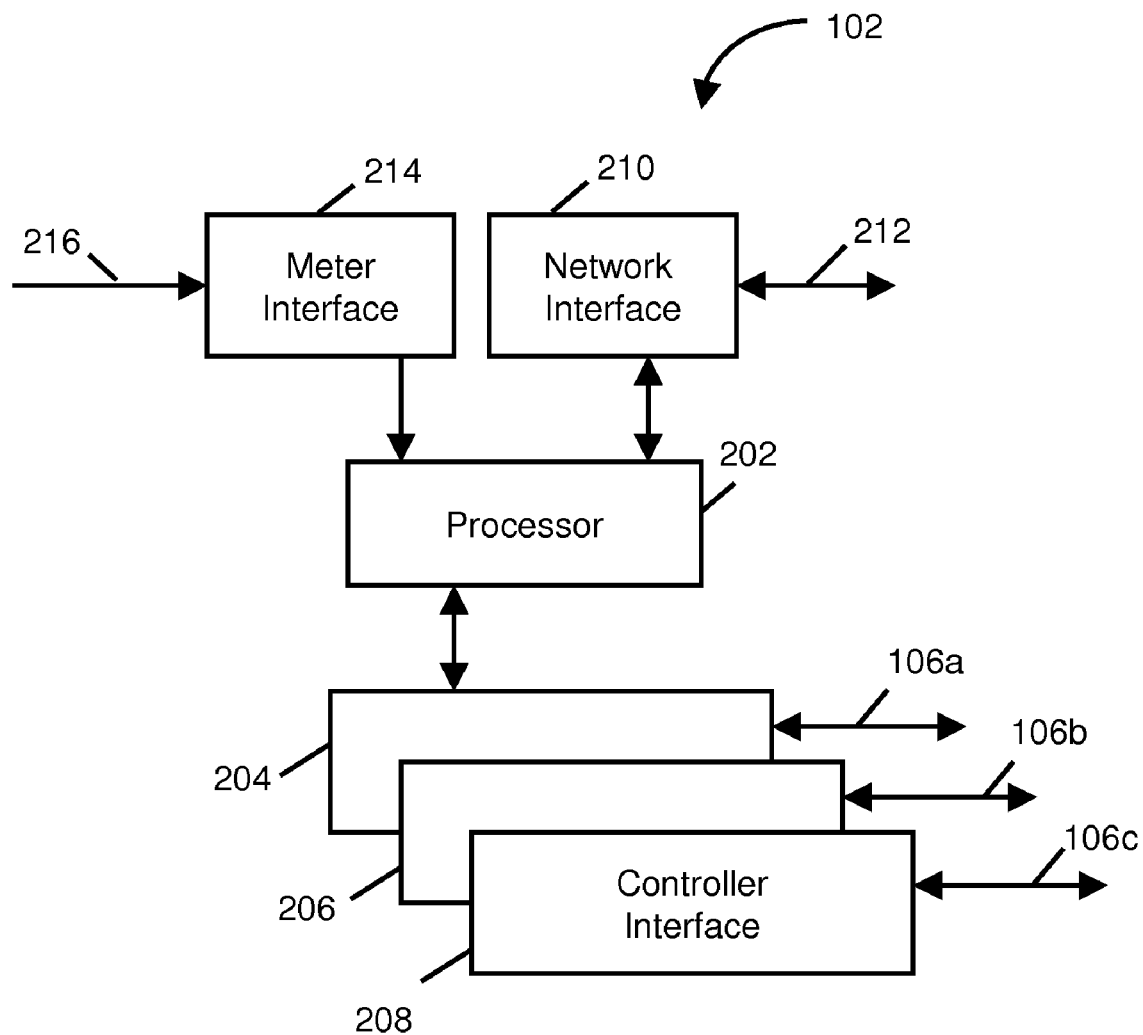
FIG. 2 is an exemplary block diagram of the collar unit of FIG. 1.

FIG. 2 is an exemplary block diagram of the collar unit of FIG. 1. The collar unit 102 performs communication and interface functions for the system. The collar unit is aptly named because it may conveniently and preferably be located in a collar at the base of the electric meter 103; however, other locations may be desired for various reasons. Referring to FIG. 2, the collar unit 102 comprises a processor 202 with a network interface 212 for communications with the utility server 107. The utility server 107 sends commands, demand profiles, algorithms, requests for data, and other information to the collar unit 102, which routes the data or responds as necessary. The collar unit 102 responds to the server 107 with acknowledgement, status, data logs, and other information as needed. The collar unit 102 may communicate with the server 107 by one or more communication channels 105 adopted by the utility including telephone, DSL, cable, fiber to the home, digital cellular, broadband over cable, satellite, 900 MHz, Zigbee, Wi-fi, Wi-max, and others.

The collar 102 also includes one or more interfaces 204-208 for one or more water heaters 101 and/or other appliances including heating, air-conditioning, freezers, electric car chargers, solar and wind generators, home automation, security, and others. The interface 106, (generally referenced 106, in FIG. 2 shown as 106a-106c to indicate multiples) may include one or more network media including wired and/or wireless, standard and/or proprietary, and may include Ethernet, Wi-fi, Wimax, Zigbee, Bluetooth, and/or others.

Each of the water heaters controlled by the separate interfaces 204-208 may be controlled separately. That is, each may be sent a different control schedule and/or temperature ranges and each may be individually monitored for actual temperature and use patterns. Thus, a kitchen water heater may see a different use pattern than a bathroom water heater, each offering different load shift opportunities.

The collar 102 may also include an interface 214 to the electric meter 103 for electric meter readings 216 including, but not limited to: kWh used, voltage, current, power history logs, outages, etc, and may include connect/disconnect functions for the utility service.

In one embodiment, the collar functionality may be integrated with the controller to produce a controller with direct network capability by phone line, cell phone, Wi-Fi or other link that connects with the control server, keeping the network functionality with the water heater and controller rather than splitting the system as shown in FIG. 1. In further integrated solution, the controller and collar functionality may be integrated into the water heater as a single combined unit. Still other system partition alternatives are envisioned including having a remote control panel having only user interface features. Multiple other partitioning options may be envisioned within the scope of the invention.

Figure 3:
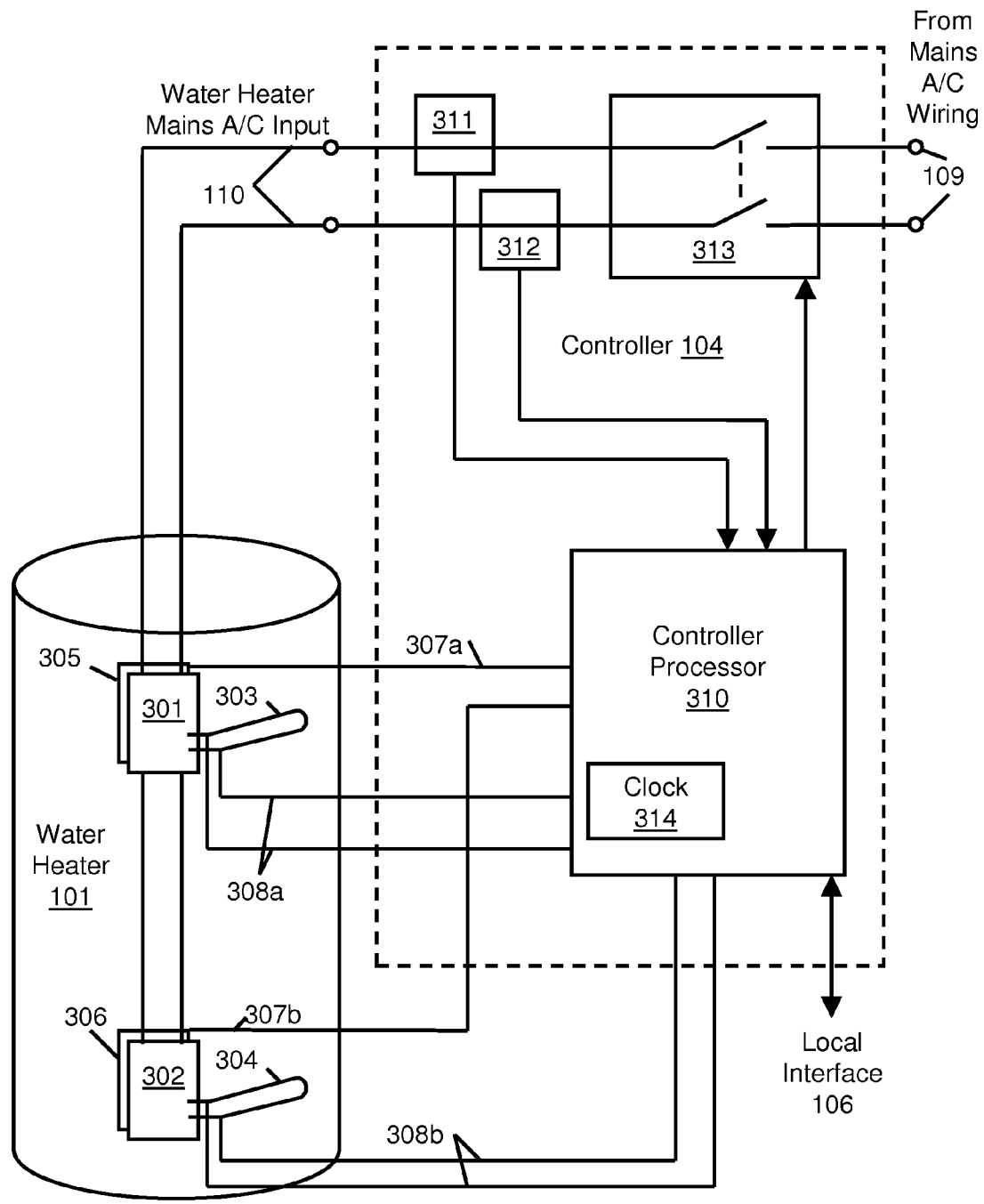
FIG. 3 is a block diagram of the water heater 101 and the controller 104 according to one embodiment of the present disclosure.

FIG. 3 is an exemplary block diagram of the water heater 101 and the controller 104 according to one embodiment of the present disclosure. The temperature of a typical water heater 101 is controlled by an upper thermostat 301, which measures the temperature in the upper portion of the water heater's tank, and a lower thermostat 302, which measures the temperature in the lower portion of the water heater's tank. In traditional operation of the water heater 101, when the temperature in the upper portion of the tank drops below a predetermined level, the upper thermostat 301 activates an upper heating element 303. Similarly, when the temperature in the lower portion of the tank drops below a predetermined level, the lower thermostat 302 activates a lower heating element 304.

The controller 104 adds the ability to turn off the water heater 101 to reduce load during a peak demand control time interval. The controller 104 also controls the heat distribution within the hot water heater 101 to maintain hot water availability during the peak demand interval without having to heat the entire tank volume. The controller 104 also provides sequencing and timing of the recovery after the peak demand interval to prevent a secondary peak demand load from hot water recovery and to restore full capacity where the capacity is needed most.

The controller 104 comprises a control processor coupled to one or more temperature sensors. Two temperature sensors are shown in FIG. 3, an upper temperature sensor 307a for sensing the temperature of the upper volume heated by the upper heating element 303, an a lower temperature sensor 306b for sensing the temperature of the volume heated by the lower heating element 304. Since heat rises, the upper heating element 303 typically heats only the upper portion of the tank volume, whereas, the lower heating element 304 typically heats the entire tank volume. The control processor 310 turns on the power to the tank 101 using switch 313 based on temperature sensors 307a and 307b and in accordance with a temperature specification or profile (temperature vs. time) communicated to the controller 104 from the utility server 107 (FIG. 1) via local interface 106. A time of day and calendar clock 314 is provided for determination of time of day. The clock 314 may be periodically set in accordance with standard time provided by the utility load management server 107 over the local interface 106.

The controller 104 may also have voltage inputs for voltage sensing wires 308a and 308b connected to the upper heating element 303 and lower heating elements 304 respectively. The voltage sensing wires may be used to sense the actual operation of the thermostats 301 and 302. In addition, the processor may receive inputs from one or more current sensors 311 and 312 to verify the power being delivered to the hot water heater 101 via the water heater mains input 110.

Figure 4:
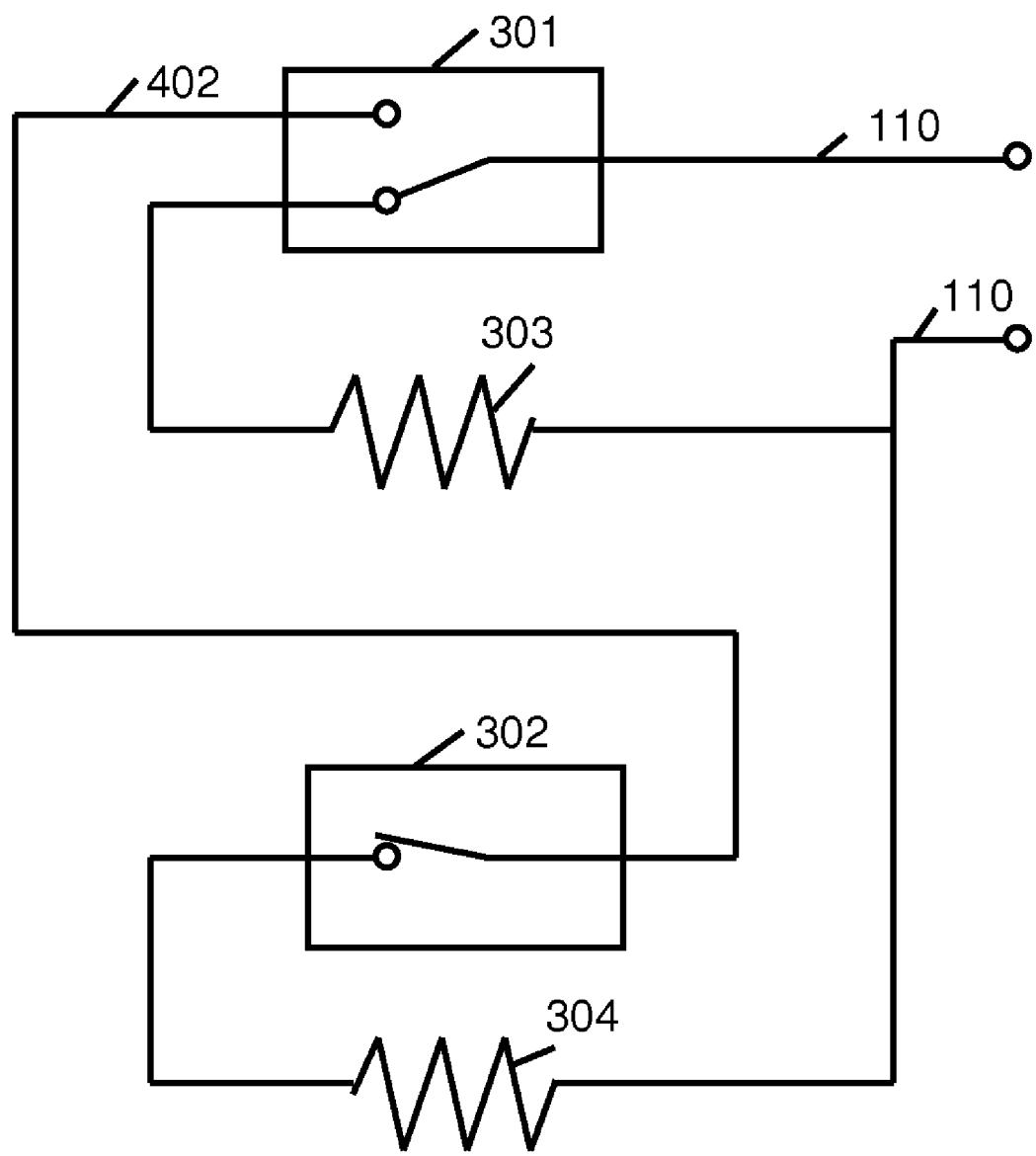
FIG. 4 illustrates an exemplary water heater with a double throw thermostat switch.

In one embodiment of the invention, the upper thermostat may be configured with a double throw switch to allow only one heating element at a time to operate. FIG. 4 illustrates an exemplary water heater circuit with a double throw thermostat switch. The double throw switch is typically implemented using mechanical bi-metallic switch mechanisms. The double throw switch architecture limits the peak load and reduces circuit requirements for the water heater 101. Referring to FIG. 3 and FIG. 4, Power is applied between terminals 110. The operation is as follows, starting with a cold water heater 101, the top thermostat 301 is switched to the cold side as shown, connecting the top element 303 to power, the bottom element 304 being disconnected from power at switch 301. When up to temperature, the top thermostat 301 switches, disconnecting the top element and connecting the lower circuit 402, which includes the lower thermostat 302 and heater 304. Since hot water rises, the top heating element 303 does not heat the lower water volume. So when the top water volume is heated to temperature, the lower water volume is still cold. When the upper thermostat 301 switches the power to the lower circuit 402, the lower thermostat 302 will be in the on state, which will power the lower heater 304 and heat the remainder of the tank contents. When the lower water volume is heated to the lower thermostat set point temperature, the lower thermostat 302 trips and the water heater 101 is idle. Incoming water is typically fed into the tank through a tube that opens into the tank at the bottom. Thus, as water is used, cold water enters the bottom, tripping the bottom thermostat 302 first and turning on the bottom heater 304. If the top water volume ever drops below the top thermostat set point, the top thermostat 301 will switch, turning off the bottom circuit 402 and feeding power to the top heater 303 for quick recovery, i.e., to heat the smaller upper volume more quickly than heating the entire volume.

A water heater 101 with a double throw upper thermostat 301 may be controlled with a controller 104 having a single switch 313 as in FIG. 3. The single controller switch 313 works in cooperation with the upper thermostat 301 to control both the upper and lower temperatures during a peak utility demand interval.

During a peak demand interval, the controller 104 turns off power to the water heater allowing the water heater upper and lower temperatures to drop below the normal maintenance temperature (the lower hysteresis point for the thermostats), yet maintaining reasonably hot water so that the consumer is not without hot water. Thus, the hot water tank rides out the peak demand interval by drifting down slightly in temperature. The tank 101 may reach and operate at a lower set point temperature than that maintained during non-peak intervals. During the interval when the tank temperature is dropping, no power is supplied to the tank heating elements 303, 304. An idle hot water heater (one not supplying hot water) should not require any power during the peak demand interval. A hot water heater that supplies hot water may allow the bottom temperature to drop to any temperature, but the top temperature is typically maintained at a predetermined minimum temperature throughout the peak demand interval. The minimum top temperature is typically below the lower hysteresis temperature of the top thermostat 301. For example, the top thermostat 301 may turn on the top element 303 below 130 degrees F. and turn off at 135 F. The corresponding lower minimum temperature controlled by the controller 104 may be 120 F. Thus, a certain amount of water may be supplied by the hot water heater 101 during a peak demand interval without requiring consumption of electrical power by the hot water heater. When the amount of water supplied is great enough to require power, only the top quick recovery heating element 303 is used.

Thus, the controller 104 external to the water heater may control the lower temperature to a predefined temperature, defined by the peak demand interval temperature profile, by supplying power when the upper thermostat switches power to the lower circuit. The switch state of the upper thermostat may be determined by either or both of the voltage sensors with optional confirmation by the current sensors. The top voltage sensor senses the voltage on the upper heater. If power is applied by the controller and is not sensed at the upper sensor, the conclusion would be that power is sent to the lower thermostat. Alternatively, voltage may be sensed at the input or output of the lower thermostat. The input voltage directly indicates the state of the upper thermostat. The output voltage, i.e., sensed by connecting to the lower heater element as shown in FIG. 3, indicates both the upper and lower thermostats are switched accordingly.

The temperature of the lower volume may be maintained at a desired temperature by observing the switch state of the upper thermostat and applying power to the lower thermostat to maintain a temperature according to the temperature sensed by the lower temperature sensor. Also, the temperature of the upper volume may be maintained at a desired temperature lower than the set point of the upper thermostat by controlling power to the water heater when the upper thermostat is connected to the upper heating element. The power may be applied according to the temperature sensed by the upper temperature sensor.

In addition to voltage sensing, the upper temperature sensor may be used to determine the upper thermostat switch state. The temperature measurement may be used to determine thermostat switch state when the controller has turned off the power to the water heater. Because of hysteresis in the thermostat switching characteristic, a history of the state should also be used to track the hysteresis. The thermostat set point and hysteresis, i.e., upper and lower switch points may be determined by observing the temperature when the voltage monitors indicate a change of state. Temperature sensors are only a suggestion of the switch state. If the temperature sensors indicate the thermostat state and after application of power, the voltage sensors indicate the opposite, the power may be removed from the water heater and the system may wait for additional temperature change and try again.

Various other voltage and current sensing combinations may be used to determine the state of the upper and/or lower thermostats. In addition, other techniques such as but not limited to special contacts or optical sensors on the thermostats may also be used to determine the switch state of the thermostats.

It is a further advantage of several embodiments of the invention, that a controller 104 may be installed in the field to control an existing water heater 101 which is a commercial item produced to be sold without the water heater controller 104 and having factory installed input connection terminals 110. The water heater may be controlled by the controller 104 by connecting to the factory installed connection terminals 110 without interfering with the design of the water heater 101 and without making modifications that would or arguably should interfere with a manufacturer's warranty, a safety testing approval, or local building codes. Specific warranties and codes may vary and the various authorities may disagree, but in principle, the connection should not disrupt or bypass any safety feature of the water heater 101. In particular, the original thermostats may be retained and are not modified. The only control exercised over the water heater is to turn off power to the water heater as a whole at the external factory supplied connection point. Temperature sensing may be added without drilling holes or interfering with existing components. Voltage sense wires are added at existing terminal blocks. None of the control and sensing features modify any of the functioning of the original water heater. Thus, the system should be capable of immediate deployment in large numbers without having to replace every water heater on the grid to enable the necessary control.

Figure 5:
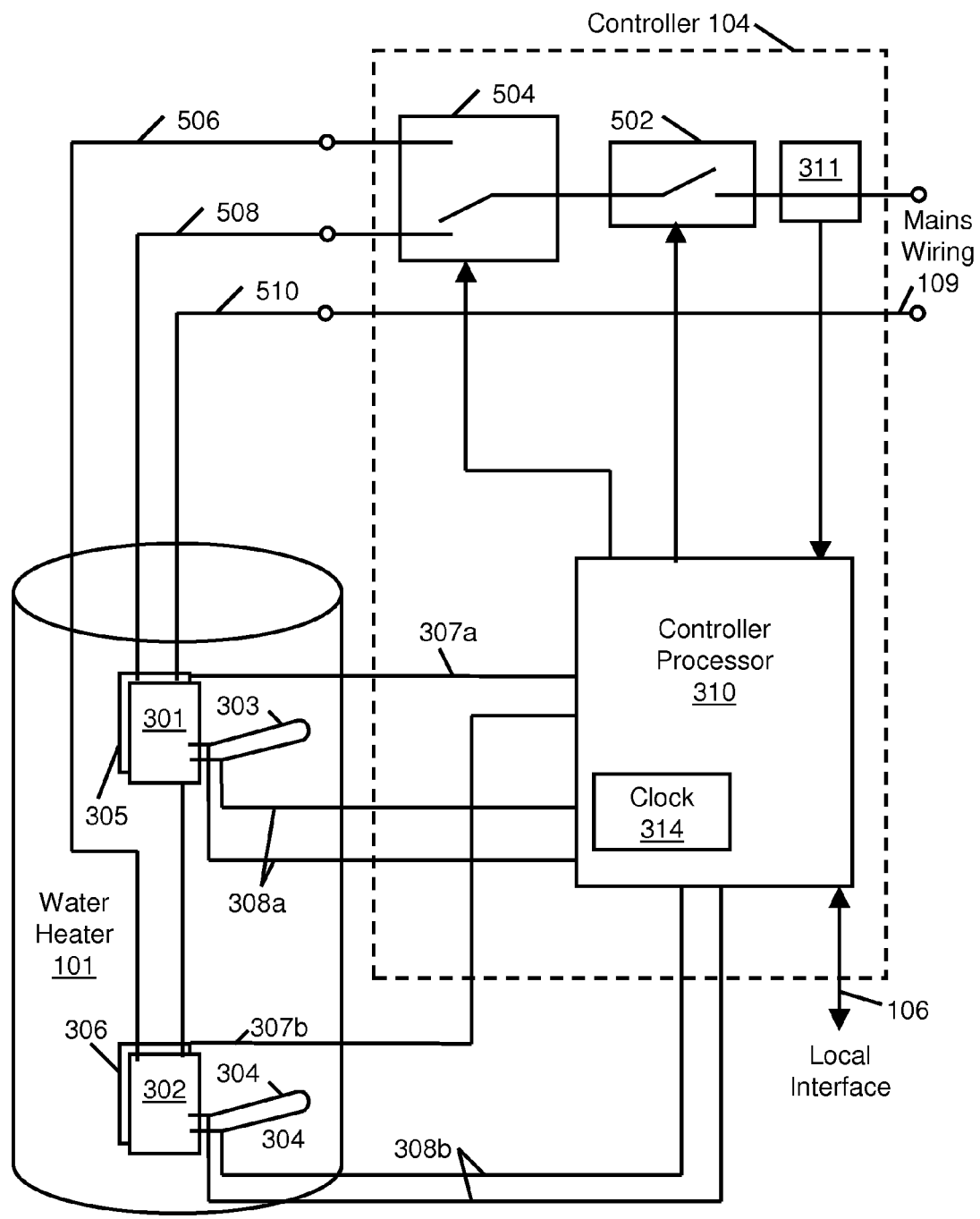
FIG. 5 illustrates an alternative controller separately controlling each heating element of a dual element water heater by operating one heater at a time.

FIG. 5 illustrates an alternative controller separately controlling each heating element of a dual element water heater by operating one heater element at a time. Referring to FIG. 5, switch 502 operates to turn on and off a selected heating element, and switch 504 operates to select the active heating element. Switch 504 cannot power both heating elements at the same time. Thus, the wire and breaker size in the supply to the water heater may be sized for a single heating element. Thermostat 301 and 302 are optional and may be used to set a top temperature above which the associated heating element will be turned off. The controller 104 can establish and control to a set point temperature for each heater according to the temperature sensors and is not dependent on the double throw thermostat at position 301 to switch between upper and lower heating. The control processor 310 may decide which heater to activate at any time. The added control flexibility allows the control processor to preheat both upper and lower to a higher than normal temperature just prior to the peak demand control interval, while also allowing the upper volume to act as a quick recovery volume in normal operation at lower temperatures.

The voltage sensing wires 308a and 308b may also be optional because there is no longer a need to determine the state of the double throw thermostat. If supplied, the wires 308a and 308b may be used for fault detection and/or detection of actual thermostat settings.

Figure 6:
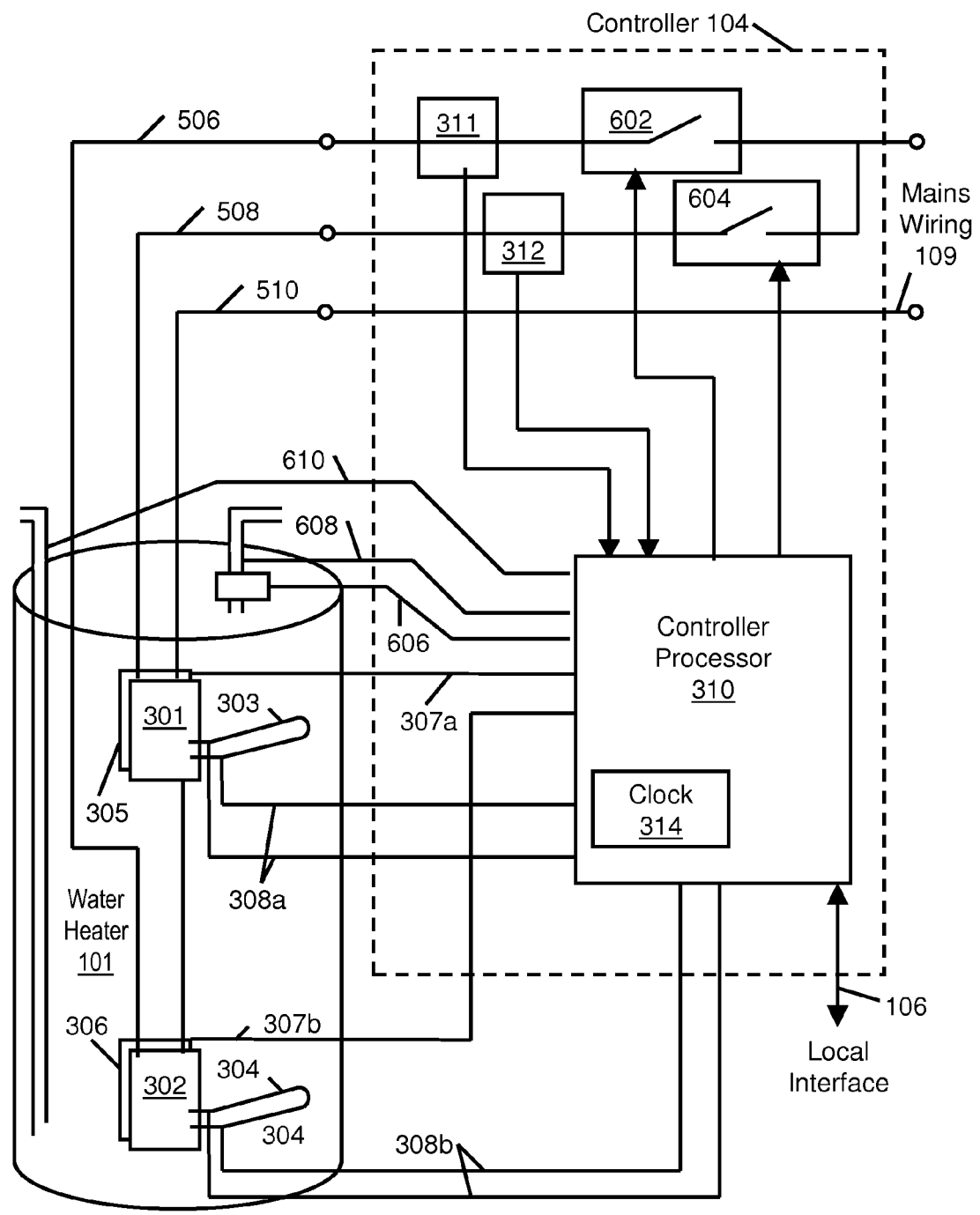
FIG. 6 illustrates an alternative controller separately controlling each heating element of a dual element water heater by operating each heater independently of the other.

FIG. 6 illustrates an alternative controller separately controlling each heating element of a dual element water heater by operating each heater independently of the other. The system of FIG. 6 includes separate control switches, each separately controlling the upper heating element and lower heating element. Switch 602 controls the power to the lower heating element 304 with the return through lead 510. Switch 604 controls power to the top heating element 303, with the return through common return lead 510. Current sensors 311 and 312 monitor the current through each respective heating element, and voltage monitor leads 308a and 308b monitor the voltage supplied to each respective heating element. The voltage and current monitors 308a,308b,311, and 312 provide positive verification of the power delivered to each heating element and verify the state of each of the thermostats. Voltage sensing or current sensing alone may be sufficient. Voltage sensing is simple and very low cost. Current sensing requires a current sensor, but requires no external wiring and thus, could be cost competitive with voltage sensing when installation costs are considered. Current sensors have the advantage of allowing the detection of a burned out heating element.

Although the system control processor and switches 602 and 604 provide full thermostatic control of the water heater 101, the mechanical thermostats 301 and 302 may be retained as a safety feature to prevent overheating in the event of a stuck relay or other failure. With sufficient safety testing, however, the thermostats may be removed, relying entirely on the controller 104.

Switches 302 and 304 are shown as single pole switches. Alternatively each heating element may be switched using a respective dual pole switch for each heating element, switching both leads to each heater (the common return lead 510 would be split, providing a separate return for each heating element 303 and 304.)

The increased flexibility of using separate controllable switches for each heating element allows for greater flexibility in the delivery of hot water, while avoiding the necessity of heating the entire tank contents.

One advantage resulting from the increased flexibility is that the water heater 101 may be operated without using the mechanical thermostats 301 and 302 (or by setting the thermostats to a high level) and thus may establish the set point to any temperature higher or lower than the normal temperature and may vary the normal temperature as desired during the day or night. Mechanical thermostats define a fixed temperature that must be manually changed and thus are impractical for daily control. Mechanical thermostats prevent operation higher than the set point and should thus be set higher than any anticipated controller commanded operation. One example where this flexibility is desirable is in providing a preheat temperature above the normal operating temperature. In the case of a double throw thermostat in the single switch system of FIG. 3, the quick recovery mode is operated by the thermostat at for example 135 F/57 C degrees. If it is desired to provide a higher preheat temperature, for example 145 F/63 C degrees, then the thermostat has to be set higher than 135 F/57 C to allow entire tank heating to 145 F/63 C, which defeats the quick recovery mode at 135 F/57 C degrees because the double throw thermostat sends power to the lower heater below 145 F/63 C degrees. In the system of FIG. 6, however, the thermostats may be set to 145 F/63 C degrees and the controller may command preheat for upper and lower heaters 303, 304 during one interval and may allow quick recovery using the upper heating element 303 during another interval.

An additional advantage of the configuration of FIG. 6 is that both heating elements can be operated simultaneously. Normally, the water heater is designed to use one heater at a time to allow the use of smaller circuit breakers and supply wiring. However, if the supply circuit is sized to operate both heating elements simultaneously by doubling the supply current capacity, then recovery speed of the full tank capacity can be increased by operating both heaters simultaneously. Operating both simultaneously potentially aggravates the recovery demand issues after the peak demand interval; however, the double current demand may be workable if a small percentage of recovery cycles actually use the feature. For example the double current feature may be triggered by a limited number of circumstances. Double current may be triggered by detection of actual water use or by the customer override button or other limited circumstance.

FIG. 6 also shows exemplary optional sensors including an inlet temperature sensor 610, an outlet temperature sensor 608, and a flow rate sensor 606. The sensors may also be applied to the water heaters of FIG. 3 and FIG. 5. The inlet temperature sensor is shown sensing the inlet pipe and connected to the controller processor 310. A preferred location would be a distance from the upper portion of the water heater to avoid conducted heat from the water heater. Alternatively, the inlet water temperature may be taken to be the lowest temperature measured over a time interval that includes water usage. The water flow temperature measurement during usage will avoid conducted heat issues. Outlet temperature may be measured at an outlet pipe. Again, measurements during actual usage will be accurate, but measurements during static non use intervals may have errors. A flow rate measuring device 606 is also provided as an optional sensor. The flow rate measuring device is shown installed in series with the outlet pipe and electrically connected to the controller processor 310. Alternatively, the flow rate measuring device may be installed to measure the cold water inlet flow. The inlet temperature sensor 610, outlet temperature sensor 608, and flow rate sensor 606 may be used to measure delivered hot water and establish customer use patterns. In addition, as explained later in this disclosure, the sensors may be used to determine existing or remaining water heater available hot water capacity at a given point in the use cycle.

Exemplary nominal specifications for a typical water heater as is commonly found in a residence are shown in Table 1. Water heaters of smaller and larger capacities and with single elements and with elements of greater or lesser power are often found and may be used with the present invention.

TABLE 1

Exemplary Water Heater Specifications

| Exemplary Nominal Specifications | |
|---|---|
| Mechanical thermostat set points | settable 110 F./43 C. to 150 F./65 C. |
| Typical (exemplary) setting | |
| Upper temperature set point for upper thermostat | 135 F./57 C. |
| Hysteresis for upper thermostat | off, 135/57 C. on 130 F./54 C. |
| Lower thermostat set point | 135 F./57 C. |
| Lower thermostat hysteresis | off, 135/57 C., on 130 F./54 C. |
| Upper heating element | 4.5 kw, 240 v |
| Lower heating element | 4.5 kw, 240 v |
| Capacity | 30 to 50 gallons, 120-200 liters |

TABLE 2

Exemplary Controller Specifications

| Typical (exemplary set point) | Programmable, 110 F. to 150 F., 43 to 65 C. |
|---|---|
| Holding method | programmable |
| Hysteresis | Programmable 0 F. to 10 F. degrees. 0 C. to 5 C. deg. |
| Minimum delay | 1 to 10 minutes |
| Override switch | optional |
| Display | Demand control status, Upper temperature, lower temperature, demand time interval, current time, network connection status, collar interface connection status |
| Current monitor | optional |
| Voltage monitor | Top and bottom, optional |
| Memory | Data log at 1 minute intervals for 1 month |

Typical controller specifications 104 may be found in Table 2. Referring to Table 2, the set points for upper and lower (if used) control are according to the demand interval command procedure sent to the unit from the utility server. The unit 104 should be capable of establishing a range of temperatures. The holding method may be selected. Relays are typically used with hysteresis or delay to limit chattering. Alternatively semiconductor switches or proportional control may be used. The override switch is optional, but preferably supplied. The controller 104 may have an optional display to display demand control status, upper temperature as measured, lower temperature as measured, the demand time interval in use and the current time, network connection and collar connection status for debug purposes. The current monitor is optional. The voltage monitors are optional. At least one voltage monitor should be used for a water heater with a dual pole thermostat to distinguish the state of the thermostat switch—upper or lower. The controller should have a memory for logging temperature and control data for a minimum period of, for example one month or other time as deemed necessary.

Any electric residential water heater may be used with the present invention, however, a water heater selected or designed for improved load shedding performance may include additional insulation and may include a larger water capacity.

A single heating element water heater may be used with the present invention by operating the single element according to the upper heating element procedures, i.e., by lowering the maintenance temperature during a peak demand interval. In addition, a single heating element water heater may include an upper and lower temperature sensor and the heater may be controlled during a peak demand interval according to the upper temperature sensor, thus allowing hot water delivery (and intake of cool water) to cool the bottom without turning on the heating element until the top begins to cool.

Utility Power Supply/Demand Profile

The peak utility supply and peak consumer demand interval may be alternatively referred to as peak demand interval, or peak demand window. The peak demand interval is usually a time interval of maximum power delivered relative to the daily power delivery cycle. The peak demand interval may vary from day to day depending on various factors including but not limited to weather and consumer usage patterns.

The peak demand interval or peak demand control interval may also refer to an interval established by utility policy either manually or automatically as the interval within which or with respect to which demand spreading measures are to be implemented. The utility power demand control interval may be based on historical actual demand profiles, but may also include the presently active measured demand.

Typical exemplary peak demand times may be five hours, from 4 am to 9 am or from 3 pm to 8 pm. The peak times may be seasonal with the morning interval being prevalent in the winter, driven by heating and morning showers and laundry. The summer pattern is driven by air conditioning load and evening water use.

Spring and fall may have less definite peak load times.

Weather and predicted weather may influence peak and demand profiles. The peak demand times may be regional due to differing weather patterns and due to differing consumer patterns.

In one embodiment, the peak demand interval for demand spreading may be established differently for different groups of customers. The differences among customers may relate to differing usage patterns, differing needs, and/or differing contract charge rates (cents per kwh) for the service. The differing demand interval may relate to the start time, ending time, or the procedure used to shift demand.

In one embodiment of the invention, the command server may command individual water heater controllers by configuring them to run independently, i.e., the server may establish the procedure once a day or once a week by providing the time-temperature profile and any other procedure decision parameters. The controller then runs independently until a new command is issued.

In addition, the control server may issue a real time command for a particular action. For example, the controller may receive information from the grid controller indicating the need for immediate demand reduction. The control server may then issue a command to a large number of water heaters to turn off immediately, consistent with network communication delays. "Immediate" in this context refers to time periods short relative to the segments of a control procedure. Time periods of less than one minute to tens of minutes are consistent with immediate in this context. "Real time" and "contemporaneous" refers to interactively reading data occurring during a particular control interval and using that data to effect a change during the control interval. Thus, the control server may use grid demand measurements for a particular hour to effect control for that same hour. Thus, the controller and system of the present invention allow the server to receive measurements during a particular day, hour, ten minute span or other interval for use during that day, hour, ten minute span, or other interval respectively.

The ability to respond to real time events allows more control than relying only on average models. When conditions indicate, water heaters may be turned down or off to a greater degree or in greater numbers than would ordinarily be called for. Thus, greater magnitudes of demand reduction may be achieved. For example, normally all water heaters would allow the upper heating element to recover to some level even in demand shift intervals. However, based on real time data, the control server may turn off all water heaters, both top and bottom elements, for a period of time, if deemed appropriate.

This extra level of control may also be used during unexpected events, such as an extreme heat wave, when a generating station or substation fails, or during periods of unexpected emergencies, such as fuel shortages, hurricanes, or other factors limiting peak supply capacity.

The various control temperatures given in this disclosure are exemplary temperatures. It should be understood that variations from the actual numbers are easily made by those skilled in the art. In addition variations from the general characterization of the numbers may also be made by those skilled in the art.

Normal operating temperature is the temperature of the water in the water heater during a non-peak demand interval. The normal temperature is typically desired to be uniform between the upper and lower portions of the water heater. Thermostat set point temperature is the temperature maintained by the top thermostat and may refer to the turn off temperature or the mid point between the turn on and turn off temperature.

Minimum operating temperature as discussed with respect to the controller refers to the controller enforced set point temperature and is typically established below the thermostat set point temperature.

Quick recovery heating element refers to the top heating element. The top heating element heats a smaller quantity of water than the bottom element and this may recover more quickly from a cold state.

Delivery volume of a water heater typically refers to the upper volume which is directly heated by the upper element and the temperature of which is sensed by the upper thermostat and/or temperature sensor. Water is typically delivered from the top of the water heater.

Inlet volume of a water heater typically refers to the lower volume. The inlet typically delivers water into the lower volume. The temperature of the lower volume is sensed by the lower thermostat and/or lower temperature sensor.

Hysteresis refers to a technique used to reduce the amount of on and off switching and thus increase switch contact life. The method is to switch off at a high temperature, for example, 130 F/54 C degrees, and switch on at a lower temperature, for example 125 F/52 C degrees. The time required to heat and cool over the hysteresis range of 5 F/2.5 C degrees reduces contact action and resulting wear on the contacts.

Alternatively, a digital controller may utilize a fixed minimum delay between changing from on to off or off to on. In a further alternative, with semiconductor switches that have no wear issues, proportional control by time intervals or voltage levels may be used. Other techniques may be used as are known in the art.

Customer hot water quality delivery criteria refers to a number of criteria for customer satisfaction with respect to the delivery of hot water. The criteria may refer to one or more of the following exemplary criteria:
1) having hot water available at a minimum temperature during most or all of the day for light usage, such as for sinks;
2) having high capacity hot water available during heavy use periods for a particular customer, heavy usage may include multiple or long showers;
3) maintaining a constant temperature for the delivered hot water;
4) quickness of the recovery from depletion of the hot water reserve; and/or
5) predictability and ease of customer management of hot water depletion events.

In one embodiment, numerical values may be assigned for deviations from ideal on each of the criteria. Thus, predicted and/or actual performance may be evaluated using the quality criteria. In a further embodiment, power leveling may be assigned a quality score and load leveling may be weighed automatically with the expected quality to select the amount of load shift to be delivered.

In accordance with the present invention, the water heater may be controlled by principles embodied in one or more of the following exemplary control sequences:

Control Sequence 1

The lower heating element is not turned on during the peak demand interval. In one embodiment, the power to the water heater is turned off when the upper thermostat is off.

Control Sequence 2

Figure 7:
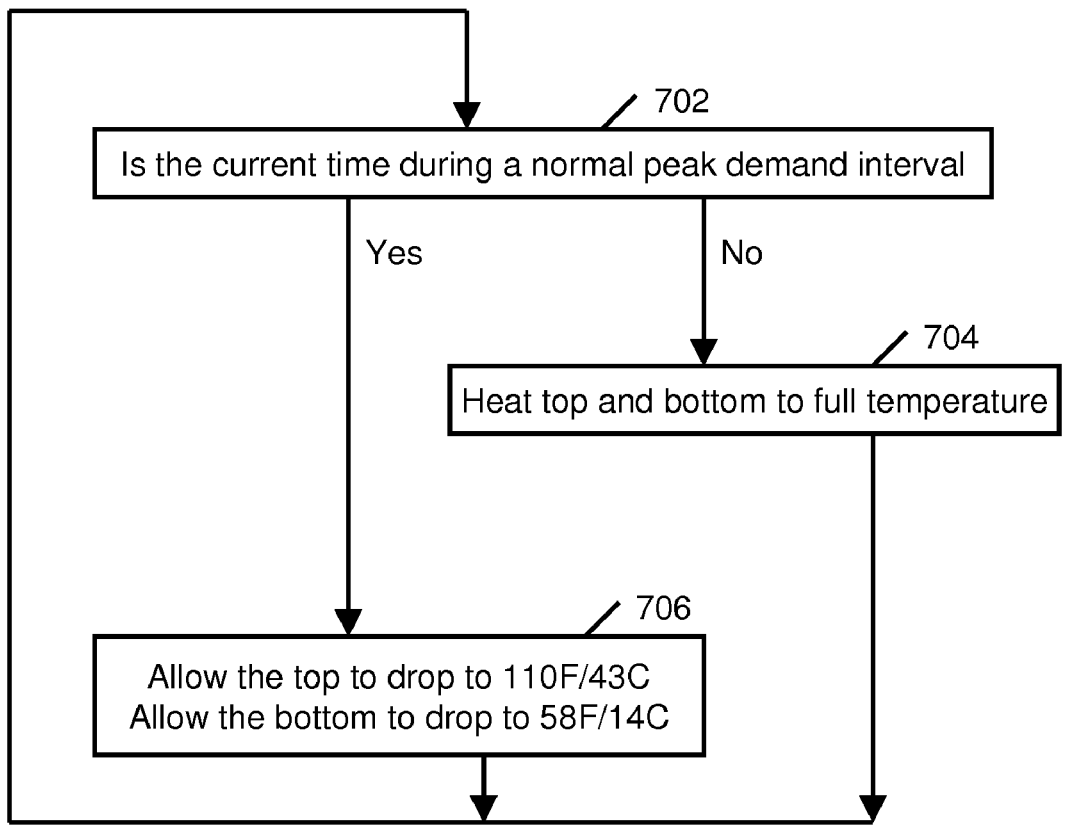
FIG. 7 illustrates an exemplary temperature control method for controlling an upper and lower heating element of a water heater.

FIG. 7 illustrates an exemplary temperature control method for controlling an upper and lower heating element of a water heater. In accordance with FIG. 7, during a demand control interval, the upper temperature is reduced, and the lower temperature is reduced or the element turned off. In one embodiment, upon entering the demand control interval, the power to the upper heater is controlled according to the upper temperature sensor in accordance with a set point lower than the normal operating temperature, and the lower set point temperature is lowered, typically lower than the upper set point temperature. In one alternative, the lower element is not used during the peak demand control interval. Referring to FIG. 7, in step 702, the controller checks for the current time being within the peak demand interval. If not, step 704 is followed, wherein the water heater is heated to normal temperatures on the top and on the bottom. If the time is within the peak demand control interval, step 706 is followed, wherein the top set point temperature is dropped from 130 F/54 C degrees to 110 F/43 C degrees and the bottom set point temperature is dropped from 130 F/54 C to 58 F/14 C degrees. Alternatively, in step 706, (not shown) the bottom may be turned off irrespective of temperature. Where the lower temperature need not be controlled, the lower temperature sensor may not be needed.

In one embodiment of FIG. 7 using a double throw thermostat, the upper temperature is controlled by the upper thermostat, i.e., when the upper thermostat calls for upper element heating as sensed by voltage sense 308a (or by lack of voltage on 308b), then power is applied by relay 313. When the upper thermostat switches to the lower circuit as sensed by lack of voltage on 308*a* (alternatively by voltage present on 308*b*), the control processor then commands relay 313 to power lower heater 304 to maintain the desired temperature sensed by lower temperature sensor 307*b*. Alternatively, the lower heater may not be used during demand shift control intervals. When switch 313 is off, upper and lower voltage sense do not detect a change in state of the upper thermostat, in which case, the upper temperature sense 307*a* may be used to detect a drop in the upper temperature sufficient to expect a switch of the upper thermostat and turn on relay 313. If the voltage sense does not then confirm the relay has switched to the upper element, then relay 313 may be turned off and the processor may wait for a further drop in temperature.

Control Sequence 3

In control sequence example 3, the peak demand time interval is divided into multiple time segments. A central peak segment is most restrictive.

Figure 8:
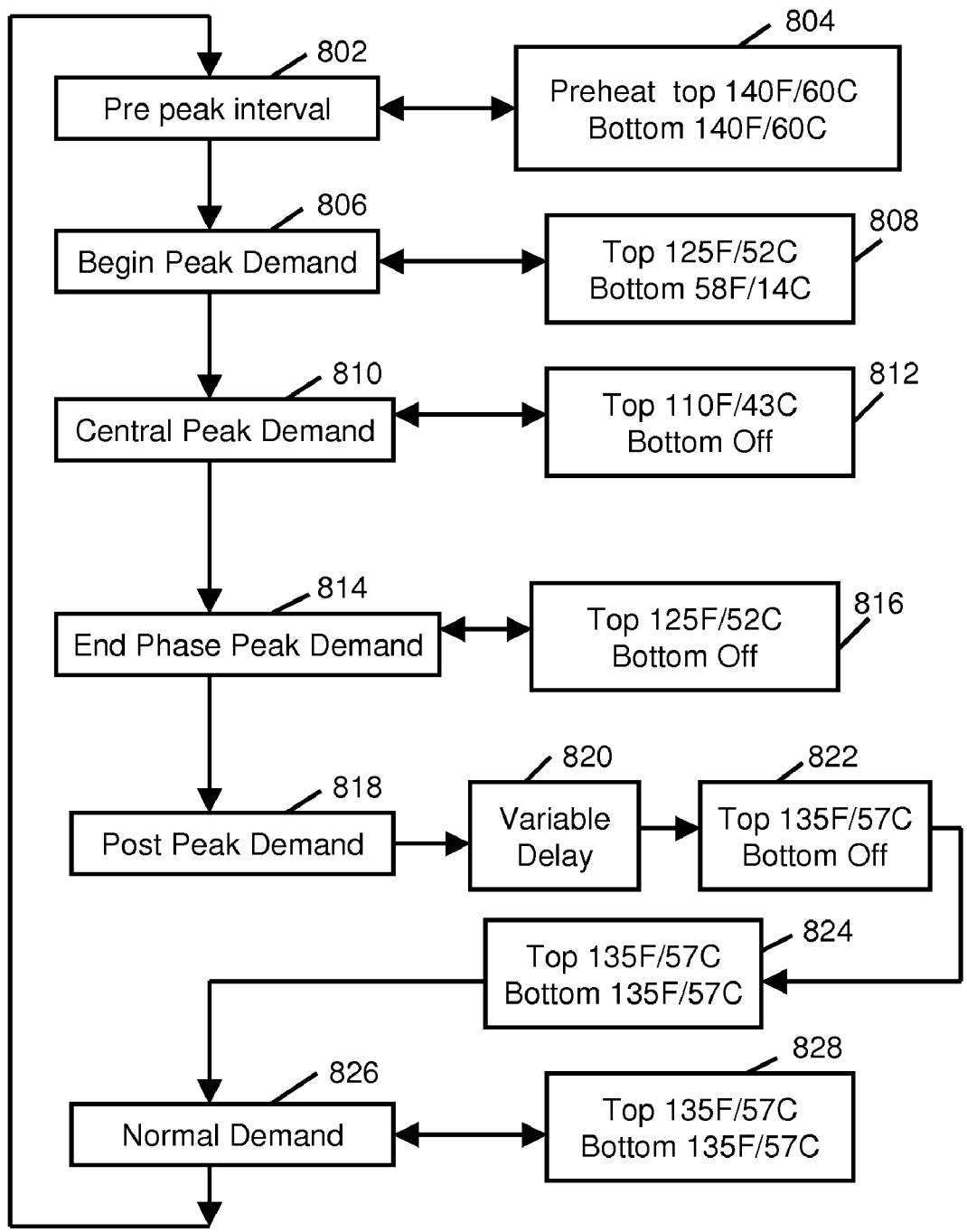
FIG. 8 illustrates an exemplary multiple segment demand shifting control sequence.

FIG. 8 illustrates an exemplary multiple segment demand shifting control sequence. Referring to FIG. 8, the first segment 802 is a pre-peak interval. During the pre peak interval, in step 804, the water heater is preheated to a temperature higher than the normal operating temperature, for example 5 F/3 C degrees higher. The higher temperature will allow the water heater to maintain at least minimum temperature longer and/or to deliver more heat during the peak demand interval without requiring electrical power.

The second interval 806 is the beginning interval. During the beginning interval, in step 808, a partial restriction is maintained. For example the top set point is lowered to 125 F/52 C degrees and the lower set point is lowered to 58 F/14 C degrees.

The third interval 801 is the central peak demand interval. During the central demand interval, in step 812, the full restriction is implemented, for example, the top set point is lowered to 110 F/43 C degrees and the lower element is not used, or equivalently, the set point is set to zero degrees.

The fourth interval 814, is the end segment. The end segment follows step 816, which may be less restrictive than the central peak demand, allowing some water heaters to partially recover.

The fifth interval 818 is the post peak demand interval. Post peak demand interval is in danger of generating a peak of its own by turning on all water heaters at the same instant. Thus the post peak interval 818 should include a method of varying the turn on time of the water heaters. In step 820, the variation may be random, may be by schedule, or may be by a use pattern. An exemplary random pattern may be generated by having each controller delay the start according to an evenly distributed pseudorandom delay of zero to 30 minutes. Alternatively, the individual delay for each controller may be determined by the central server 107 and controlled by command by the central server. Alternatively, or in addition to the random delay, the turn on may be dependent on user patterns or on actual tank temperatures or tank remaining capacity. For example, cold lower tank at the end of the peak demand interval may indicate actual water use and may the water heater may merit earlier complete recovery, whereas an untouched tank showing only nominal temperature decay through normal cooling, may indicate no one home using or needing hot water and thus may be further delayed without consumer impact. Normal usage patterns may also be considered with respect to delaying water heater recovery.

The recovery itself is staged 824 so that the top quick recovery volume is heated first followed by the lower tank volume.

In step 826, after reaching normal temperature, normal temperature is maintained 828 until the next peak demand interval.

Each of the above segments are exemplary and optional. Many different demand control profiles may be generated by varying the above exemplary segments and temperature and time parameters in accordance with the teaching herein.

Power Failure

The system may also mitigate the power surge upon restoring power after a power failure. By designing the power on characteristic of the controller to hold the power relays off for a few seconds until the computer is operational and able to assess the situation, the water heater will not present a load during the first few seconds where utility power is used to start refrigerators and other large motors. Once the computer is operational, the computer may contact the server for instructions, and/or may implement a turn on delay process 820 before turning the water heater back on. Thus, the controller may delay the power turn on to reduce both the immediate spike as well as a longer demand peak as water heaters are recharged.

Volumetric Usage and Capacity

In accordance with on embodiment of the invention, volume of hot water usage in gallons or liters at a desired temperature are estimated by measuring the upper temperature and lower temperature and observing the power input to the water heater. Referring to FIG. 1, the power input to the water heater may be determined by knowing the voltage at the customer's location and the resistance of the water heater element. The time interval that the water heater is drawing power may be determined by observing the current sensor, if so equipped, or by measuring the voltage on the heating element, if the voltage sense wire is installed. The relay power alone may not be sufficient for water heaters having a mechanical thermostat; however, either the voltage sense or current sense can eliminate ambiguity in the thermostat state. Thus, the power input over time can be monitored.

Usage can be monitored by installing a flow measurement device at the water heater. Gallons or gallons per minute of usage can be recorded by the processor and an average usage can be determined over time. For example, usage can be recorded each day for each ten minute interval. A running average may be determined for each respective ten minute interval for the last 30 days. Other daily intervals may be used and other numbers of days for the running average may be used. Thus, an average expected demand as a function of time during the day may be generated for each water heater. Further, data from weekends and or holidays may be separated from week days to further refine the estimates, e.g., data from the last 10 week days may generate a weekday running average and data from the last 10 weekend days may generate a weekend running average. Thus, the average daily pattern may be continuously updated on a periodic (daily) interval.

Alternatively, usage may be estimated by monitoring the upper and lower temperature sensors 608, 610 in combination with monitoring the power input to the water heater 101. A model of the vertical temperature profile of the water heater is developed and used to solve for the usage that results in the measured temperatures at the upper and lower locations. The power input to the upper and lower heater elements is determined from voltage and/or current monitors. The water inlet temperature may be measured or may be estimated. A temperature sensor 610 may be installed at the inlet pipe serving the water heater. In the absence of a direct measurement, the inlet water temperature may be estimated as the typical underground temperature in the area for the season. The utility may sample a few locations and use the temperature for all water heaters. Alternatively, the inlet temperature may be estimated as the lowest temperature achieved by the lower temperature sensor during a long power off cycle. The lower temperature will asymptotically approach the inlet temperature in the absence of power input when there is water usage.

A simple water heater vertical temperature profile may be implemented as a linear temperature gradient from the location of the full heated temperature to the inlet temperature. Alternatively, other curves such as an exponential or logarithmic curve may be used. Ideally, measured data may be taken from several water heater types and used to generate empirical models of the water heater vertical temperature profile as a function of usage and power input.

Figure 9:
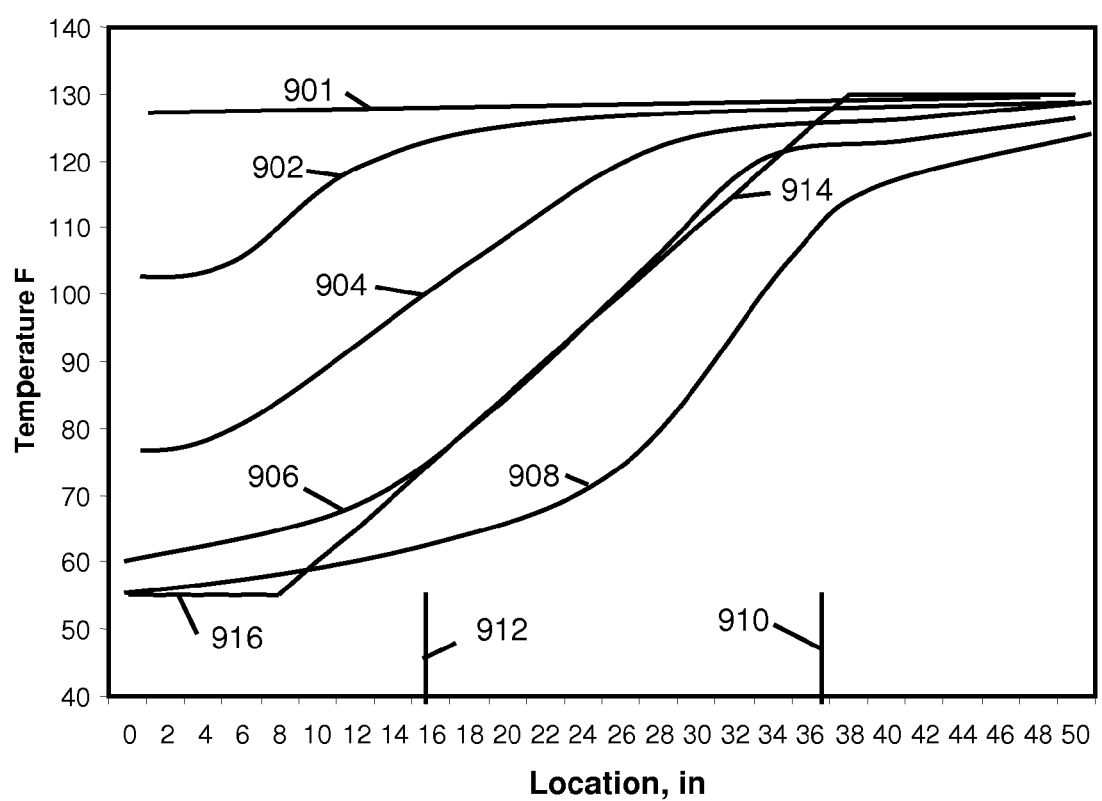
FIG. 9 is a notional depiction of a typical water heater vertical temperature profile model as hot water is used from the tank.

FIG. 9 is a notional depiction of a typical water heater vertical temperature profile model as hot water is used from the tank. FIG. 9 depicts the concept generally, but does not show measured values. Referring to FIG. 9, the temperature is plotted as might be measured on the side of the tank at the location shown on the X axis. Plots 902-908 show different increasing levels of usage of the hot water in the tank without the addition of power to restore the tank to full temperature. Each graph 901-908 may represent, for example 10 additional gallons of usage. The upper temperature probe 910 and lower temperature probe 912 locations are shown. Initially 901, the tank is heated to full temperature and the tank equalizes through conduction of heat. As hot water is used, cool water enters the bottom of the tank 902. As cool water continues to fill the bottom of the tank, the cool level rises and some mixing distributes the cool water vertically 904. The process continues to 906 and 908, at which point the upper temperature sensor reaches the control level and the upper element is turned on to maintain the upper temperature. A sequence of curves 901-908 may be used as a model of the progressive usage of water from the tank. Alternatively, a piecewise linear approximation, such as plot 914 may be used. Plot 914 approximates plot 906. A series of plots like 914 would approximate 901-908.

In operation, the temperature at location 912 and 910 would be used to determine the plot 901-908 that is closest to the measured temperatures, and the present usage and remaining capacity may then be determined. Interpolation may refine the estimate. Normally, the water heater tank is depleted without adding power during the demand shift period and then fully restored to plot 901 after the demand shift period. If heat is partially restored as demand resumes, additional families of graphs may be used to refine the estimate.

In addition to the usage and capacity obtained by monitoring the tank temperatures, overall usage volume may be obtained by computing volume based on delivered temperature, input temperature, and power consumed. The overall usage may be computed without modeling the vertical profile. The input temperature is estimated as above, and the output temperature is measured or estimated. In the absence of a measurement at the output pipe, the upper temperature probe or thermostat setting may be used as an output estimate. The delivered volume is then:

$$V = \frac{Pt}{\rho c(T_{out} - T_{in})}$$

where,

V is the volume, e.g. ml.

$\rho$ is the density of water, e.g. 1 g/ml c is the specific heat capacity of water, e.g., 4.18 Jg$^{-1}$K$^{-1}$ P is the power delivered to the water heater, e.g., watts, t is the total time either the top or bottom heater is on, e.g. seconds, $T_{out}$ is the outlet temperature of the water heater, e.g. C, $T_{in}$ is the inlet temperature to the water heater, e.g. C.

The total volume delivered should be computed between time points having the same storage state, e.g., plot 901, fully heated, to avoid errors due to different stored heat values.

Peak Demand Load Shift

According to one embodiment, baseline demand and baseline usage patterns are obtained without commanding any control on the water heaters, i.e., by operating all water heaters at full regular temperature, both top and bottom heaters. A control strategy is devised and control processes are downloaded to each water heater controller. The control is operated for a period of time and the controlled demand and usage patterns are then measured. The baseline and controlled patterns are compared to determine the change as a result of the control. Periodically, or as needed, the control may be turned off to reestablish the baseline. Baseline and control time periods may be preferably from one to two weeks to gather sufficient data. Shorter and longer periods may also be useful depending on the data being gathered.

Customer Use Patterns

In accordance with one embodiment of the invention, customer use patterns may be determined and used to select water heaters to be used for load shifting. Patterns may be determined on a continuously or periodically updating basis so that changes in customer status are reflected in the current database. In addition to expected patterns, control may be based on the actual measured capacity and actual measured use. For example, the historical use pattern may indicate a fully heated water heater is expected at customer A, but current measurements indicate only 30% remaining capacity with ongoing use. Thus, customer A would not be a candidate for load shift at the current moment and the system would move on to select a different customer.

By detecting water usage patterns, the control server may identify the location of each of several water heaters within a household as being primarily kitchen, bath, or guest room use and may classify each in associated groups with other households and may control each separately.

According to one embodiment, the load is shifted by identifying water heaters that have a near term measured historical use pattern (daily time period) outside of an expected peak demand period where the water heater may be turned down or off during the peak demand period and turned back on after the peak demand period to return to normal temperature before predicted use of the water heater. For example, a water heater may have a low probability of use between 3:00 PM and 5:00 PM. The water heater may be selected for load shifting to mitigate an anticipated 4:00 PM to 5:00 PM peak.

According to another embodiment, water heaters may be grouped according to use patterns and operated as groups. For example a first group may have a use pattern showing low probability of use between 3:00 PM and 5:00 PM. A second group may show a low probability of use between 3:00 PM and 6:00 PM and so on. Both groups may be selected to mitigate a 4:00 PM to 5:00 PM peak. The first group may then be the first to recover to full temperature after the 4:00 PM to 5:00 PM peak.

According to another embodiment, water heaters may be grouped according to the primary function or associated room being supplied by the water heater, such as kitchen, bathroom, guest room, whole house, or other. The group may be by measured pattern or by a survey form entered by the installer or an inspector. The kitchen may have a typical use pattern of 0.2 gallons (0.8 liters) per minute and may include midday use. The bathroom may include showers at 2 gallons (8 liters) per minute with primary use morning and night. A guest room may have infrequent usage. Numerous other patterns and categories may be identified.

A household may be classified according to the number of adults and children served by the water heater.

According to another embodiment, a reserve capacity may be established for a water heater and under normal circumstances, the water heater is not allowed to go below the reserve capacity without restoring power to the water heater. Water heaters may be identified and/or grouped according to the probability of use beyond the reserve capacity.

According to another embodiment, the water heater (lower element) may be turned down or off until a period just before predicted use at which point, the water heater is turned on in order to recover to normal temperature by the beginning of the predicted use time.

According to another embodiment, if the predicted use time is during a demand peak, the water heater is heated to full temperature before the demand peak, turned off during the demand peak until actual measured usage dictates more hot water is needed and then water heater power is resumed during the demand peak to supply the actual usage.

According to another embodiment, a water heater which is turned down on a long term basis due to infrequent usage may be turned up somewhat before a demand peak to avoid a thermal maintenance (hysteresis recovery) cycle during the demand peak and then turned up later in anticipation of a predicted usage period.

According to another embodiment, users who historically demand hot water first are powered first to recover to full capacity after the peak recovery interval begins.

According to another embodiment, users may periodically report their temperatures and users with the lowest temperatures may be given power first.

Retrofit of Existing Water Heaters

New water heaters may be designed in accordance with the present invention by incorporating a controller into the water heater and/or by integrating water heater thermostat sensing and control functions with the controller.

Existing water heaters need certain modifications to provide the sensing needed by the controller. Depending on the controller features implemented, top or bottom or both temperature sensors may be installed and top or bottom or both voltage sensors may be installed. The top temperature sensor may preferably be added to the mounting for the top thermostat as this mounting is designed to have proper thermal coupling to the water in view of the convection currents caused by the heating element. Alternatively, some suitable locations may be found on the side of the water heater. The top sensor should generally be higher than the lower sensor and should measure temperature related to the upper heating element heating. The temperature sensors may be attached by adhesive, such as epoxy, or by wedging the sensor between the tank and outer case of the water heater. Other attachment techniques may be used. A preferred attachment device for the thermostat location is now described.

In order to retrofit an existing water heater 101 for the purposes of the present invention, two temperature sensors, an upper temperature sensor 305 and a lower temperature sensor 306, are installed at the top and bottom thermostats 301 and 302 of the water heater. Mechanically, each of these temperature sensors 305 and 306 include a thin metal plate of approximately the same footprint dimensions the existing thermostats 301 and 302. At the top of these metal plates is a tab (not shown) with a temperature sensor attached (i.e. a J-K thermocouple or a semiconductor type temperature sensor). These metal plates are installed between the existing thermostats and the inner wall of the water heater tank. Since these plates are thin (typically $1/16^{th}$ inch or less (1.5 mm)) and the metal from which they are made is a good thermal conductor, it is expected that there will be a very small temperature drop across the plate (i.e. from the tank wall to the back of the thermostat) so that the insertion of this temperature sensor has have a negligible impact on the operation of the existing thermostats. Each of these two temperature sensors 305 and 306 typically has a low voltage wire pair 307a and 307b that connects back to the controller 104 so that the upper and lower tank temperature may be measured and reported by the controller 104.

In some embodiments, voltage to each of the heating elements 303 and 304 is measured via a pair of wires 308a and 308b connected across the upper and lower heating elements. Each of these wire pairs 208 terminates back at the controller 104 so that a determination may be made as to which heating elements (i.e. upper 303 and/or lower 304) are currently energized. It may be necessary to put either a fuse or high impedance resistor in series with the wire pairs 308a and 208b at the origination point so as to eliminate any high voltage electrical hazard.

Current sensors 311 and 312 on the AC mains inside the controller 104 are used to determine the time of use energy consumption of the entire water heater 101. The current sensors 311 and 312 are also useful as a diagnostic aid to determine when a heating element (303 or 204) or thermostat (301 or 302) has failed (e.g. an energized heating element that is not drawing current is presumably failed open). Although FIG. 3 illustrates two (2) current sensors 311 and 312, some embodiments of the system use only one (1) current sensor. Two sensors are not necessarily required because the current in each leg should be the same.

Installation of the Temperature Sensors 305 and 306

The sensor wires may be installed by unscrewing the lugs for AC mains wiring connected to the bottom heating element and any clamps holding it in place. A new AC mains wire set of sufficient capacity and type (i.e. complying with local and national electrical code), a low voltage sensor wire pair (which is connected to the temperature sensor plate 305 or 306), and a voltage sensor wire pair which will be connected in parallel with the bottom heating element are assembled as a bundle. This may be practically accomplished by using a pre-made wiring harness. The resulting wire bundle is temporarily connected to the original lower element AC mains wiring. The original AC mains wire is pulled from the upped thermostat opening, pulling the new wire bundle to the top thermostat opening. The new AC mains wiring is reconnected in place of the original AC mains wiring to the lower element. The lower thermostat is removed, and the lower temperature sensor plate is installed on the back of the original lower thermostat and the thermostat is replaced. The voltage sensor wire pair is connected to the lugs which carry voltage to the lower heating element. The lower thermostat cover is replaced. At the upper thermostat opening, the original thermostat is removed and the upper temperature sensor plate is installed on the backside of the thermostat which is then replaced. The upper heating element voltage sensor wire pair is connected across the upper heating element. All of the wiring from the upper and lower thermostats/heating elements are connected to the designated terminals on the control unit. Installation should take only about 30-45 minutes per installation.

Override Switch

In one embodiment the controller may have a customer option to override the water heater for the customer to turn on regardless of the peaking conditions. Use by customers of the override option should be rare since the customer's behavior would have already been studied and the customer should always have hot water. In the event that the override switch is used, customer will be billed at the premium rate based on the time associated with the usage.

The customer override function is activated by a switch or button on the water heater controller. In the event the customer activates the override function, a notification will be sent to the server and the server will deactivate the override after a predetermined time period has passed.

Water Heaters with a Factory Installed Temperature Probe.

The water heater controller unit will operate with newer models of water heaters that have a temperature probe installed at the factory, by utilizing the factory installed probe sensors to connect to the controller unit.

Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

Specific applications have been presented solely for purposes of illustration to aid the reader in understanding a few of the great many contexts in which the present invention will prove useful. It should also be understood that, while the detailed drawings and specific examples given describe preferred embodiments of the invention, they are for purposes of illustration only, that the system and method of the present invention are not limited to the precise details and conditions disclosed and that various changes may be made therein without departing from the spirit of the invention which is defined by the following claims:

What is claimed is:

1. A water heater controller for controlling a water heater to alter electrical demand while providing hot water for normal use, said water heater comprising an upper heater for heating an upper volume of water and a lower heater for heating a lower volume of water;

said water heater controller comprising:

power control means for controlling power supplied to said upper heater and for controlling power supplied to said lower heater;

a processor configured for controlling said power control means, said processor having a memory, said memory storing a load shift algorithm comprising instructions for varying power applied by said power control means, said load shift algorithm specifying a reserve volume capacity of hot water for said water heater, said reserve volume capacity being a minimum volume of hot water reserved for consumer use and not utilized for load shifting;

a lower temperature sensor configured for measuring a temperature of said lower volume of water and providing a resulting lower volume temperature measurement to said processor;

means for determining a remaining volume capacity of hot water in said hot water heater, said remaining volume capacity being a capability to deliver said remaining volume of hot water on immediate demand;

wherein said processor is configured to control said power control means to control a temperature of said lower volume of said water in accordance with said load shift algorithm when said remaining volume capacity exceeds said reserve volume capacity, and said processor is configured to allow recovery when said remaining volume capacity is less than said reserve volume capacity.

2. The water heater controller of claim 1, further including a network interface, wherein said processor is configured to receive at least a part of said load shift algorithm over said network interface from a control server, said control server in communication with a plurality of additional water heater controllers at separate customer locations on a power grid.

3. The water heater controller of claim 2, wherein said processor is configured to provide said remaining volume capacity determination to said control server and said control server is configured to select said water heater for load shift control based on said remaining volume capacity determination for said water heater.

4. The hot water heater controller of claim 2, wherein the processor is configured to record historical usage data comprising temperature measurements and power control, and said processor is configured to provide said historical usage data to said control server over said network interface and said control server is configured to generate said at least part of said load shift algorithm based on said historical usage data.

5. The hot water heater controller of claim 2, wherein the water heater includes at least one mechanical thermostat connected in series with said upper heater or said lower heater, and said water heater controller further including a voltage sensor configured for sensing the voltage at an output of said at least one mechanical thermostat to determine a switch state of said at least one mechanical thermostat for said control of said temperature of said lower volume of said water.

6. The hot water heater controller of claim 2, wherein the water heater controller is further configured to receive a command from said control server to override the requirement for controlling said temperature of said lower volume when said remaining capacity exceeds said reserve capacity, and to lower a temperature of said water heater regardless of the remaining capacity.

7. The hot water heater controller of claim 2, wherein the water heater controller is further configured to receive a command from said control server to override the requirement for controlling said temperature of said lower volume when said remaining capacity exceeds said reserve capacity, and to turn off power to the upper and lower heater regardless of the remaining capacity.

8. The water heater controller in accordance with claim 1, wherein said processor is configured to control said lower volume of water to preheat said lower volume of water prior to a peak electrical demand interval.

9. The water heater controller in accordance with claim 8, wherein said lower volume of water is preheated to a temperature higher than a predefined normal temperature.

10. A method for controlling a plurality of water heaters to reduce peak loading on a power grid comprising the steps of:

receiving temperature data by a water heater control server from each water heater of a plurality of water heaters, each said water heater of said plurality of water heaters connected to said power grid at separate customer locations;

said water heater control server generating usage pattern information for each said water heater of said plurality of water heaters based on said temperature data;

receiving load demand information by said water heater control server from a power grid monitoring system monitoring said power grid;

said water heater control server commanding said plurality of water heaters in accordance with a control strategy comprising a temperature limit over time for each water heater of said plurality of water heaters based on said received temperature data, said usage pattern information, and said load demand information;

wherein said control strategy is derived by said control server in accordance with at least one hot water delivery quality criterion applied to said usage pattern information specific to each said water heater of said plurality of water heaters;

said at least one hot water delivery quality criterion being a numerical value relating to the availability of hot water when needed and/or the constancy of temperature of the hot water as delivered.

11. The method of claim 10, wherein the water heater control server commands a control procedure that includes allowing a temperature of a delivery volume of a water heater to drop to a lower temperature than normal operating temperature to delay water heater electrical demand.

12. The method of claim 10, wherein the water heater control server commands a control procedure that includes allowing a temperature of an inlet volume of a water heater to drop to a lower temperature than normal operating temperature to delay water heater electrical demand.

13. The method of claim 10, further including the steps of:
receiving real time peak demand information from said power grid monitoring system; and
sending a command by said water heater control server to a majority of said plurality of said water heaters to reduce demand in response to said peak demand information reported by said power grid monitoring system.

14. The method in accordance with claim 10, wherein the control strategy comprises preheating said at least one water heater of said plurality of water heaters prior to a peak demand interval of said peak loading.

15. A method for shifting a timing of an application of a load to a power grid to reduce a peak load on said power grid, said method comprising the steps of:
providing a control server in network communication with a plurality of water heater controllers controlling a respective plurality of water heaters connected to said grid;
determining historical water heater usage patterns for each water heater of said plurality of water heaters, said historical usage patterns comprising usage as a function of time over at least one daily interval;
receiving a load shift goal by said control server from a power grid controller controlling said power grid;
selecting a first set of water heaters of said plurality of water heaters based on said historical water heater usage patterns;
receiving contemporaneous hot water remaining capacity measurements by said control server for each water heater of said first set of water heaters;
selecting a second set of water heaters based on said contemporaneous hot water remaining capacity measurements, said second set of water heaters being a subset of said first set of water heaters;
commanding said respective water heater controllers for said second set of water heaters to reduce a temperature associated with a lower heating element of each water heater of said second set of water heaters to delay an electrical demand associated with heating water in said second set of water heaters.

16. The method of claim 15, wherein the step of selecting said first set of water heaters includes selecting water heaters in accordance with at least one group, the members of said at least one group having at least one common usage category attribute.

17. The method of claim 15, wherein the remaining capacity is based on a volume measurement of hot water.

18. The method of claim 17, wherein the volume measurement is based on an upper temperature measurement proximal to an upper heating element and a lower temperature measurement proximal to a lower heating element together with power delivered to the water heater.

19. The method of claim 17, wherein the volume measurement of hot water is based on at least one temperature measurement between the top and the bottom of the water heater and a heat distribution model of the hot water heater vertical temperature profile as a function comprising usage and power applied to the water heater.

20. The method of claim 15, wherein the step of selecting said first set of water heaters includes selecting at least one water heater according to expected future demand.

21. The method of claim 20, wherein said at least one water heater of said first set of water heaters is selected based on said at least one water heater of said first set of water heaters having expected future demand that is the farthest time in the future.

22. The method of claim 15, wherein said historical water heater usage patterns are based on a volume measurement of hot water.

23. The method of claim 22, wherein the volume measurement of hot water is based on an upper temperature measurement proximal to an upper heating element, a lower temperature measurement proximal to a lower heating element, and power delivered to said water heater.

24. The method of claim 22, wherein the volume measurement of hot water is based on at least one temperature measurement between the top and the bottom of the water heater and a heat distribution model of the hot water heater vertical temperature profile.

25. The method of claim 15, wherein the second set of water heaters is further selected based on maintaining a predetermined minimum available remaining capacity at each water heater of said second set of water heaters.

26. The method of claim 15, wherein an average daily usage pattern is determined as an average volumetric usage rate as a function of time over a 24 hour interval.

27. The method of claim 26, wherein the average daily pattern is determined as a moving average of a predetermined number of daily patterns.

28. The method in accordance with claim 15, wherein the step of commanding said respective water heater controllers comprises preheating a volume of water prior to a peak electrical demand interval of said peak load on said power grid.

29. The method in accordance with claim 28, wherein said volume of water is preheated to a temperature higher than a predefined normal temperature.

30. A water heater controller for controlling a water heater to alter electrical demand, said water heater comprising an upper heater for heating an upper volume of water in accordance with an upper thermostat and a lower heater for heating a lower volume of water in accordance with a lower thermostat, said upper thermostat switching from said upper heater to said lower thermostat when said upper volume of water is above an upper thermostat set point; said water heater controller comprising:
- a power input for receiving power from a power source;
- a power output for connecting to said water heater and supplying power to said water heater;
- a power control device connected between said power input and said power output for varying the power supplied to said water heater;
- a processor having a memory, said memory for storing a load shift algorithm for varying power applied to said water heater to alter the electrical demand by said water heater, said processor configured for controlling said water heater by controlling said power control device;
- a lower temperature sensor for measuring a temperature of said lower volume of water and for providing a resulting lower volume temperature measurement to said processor;
- a thermostat state sensor for determining a switch state of said upper thermostat and communicating said switch state to said processor;
- wherein said processor is configured to operate said power control device to control a temperature of said lower volume of water when said upper thermostat is switched to deliver power to said lower thermostat, said temperature of said lower volume of water controlled in accordance with said load shift algorithm, said lower volume temperature measurement, and said switch state of said upper thermostat.

31. The water heater controller of claim 30, wherein the upper thermostat state sensor comprises a voltage sensing associated with said upper thermostat.

32. The water heater controller of claim 30, wherein the water heater is a commercial item produced to be sold for final installation without said water heater controller, and said water heater having factory supplied power input terminals, and said water heater controller is configured to control said water heater through said factory supplied power input terminals.

33. The water heater controller of claim 32, wherein the water heater controller is configured to be installed to control said water heater without bypassing safety related components on said water heater.

34. The water heater controller of claim 30, further including an upper volume temperature sensor in communication with said processor for producing an upper volume temperature measurement, and said lower volume of water is further controlled in response to said upper volume temperature measurement.

35. The water heater controller of claim 34, wherein the processor is configured to utilize the upper volume temperature measurement to determine whether the upper thermostat is switched to the lower thermostat when the power controller is switched off.

* * * * *